US012317056B2

(12) United States Patent
Mate et al.

(10) Patent No.: US 12,317,056 B2
(45) Date of Patent: May 27, 2025

(54) METHOD AND APPARATUS FOR COMMUNICATION AUDIO HANDLING IN IMMERSIVE AUDIO SCENE RENDERING

(71) Applicant: Nokia Technologies Oy, Espoo (FI)

(72) Inventors: Sujeet Shyamsundar Mate, Tampere (FI); Jussi Artturi Leppanen, Tampere (FI); Antti Johannes Eronen, Tampere (FI); Lasse Juhani Laaksonen, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 141 days.

(21) Appl. No.: 17/944,299

(22) Filed: Sep. 14, 2022

(65) Prior Publication Data

US 2023/0090246 A1 Mar. 23, 2023

(30) Foreign Application Priority Data

Sep. 17, 2021 (GB) ..................................... 2113301

(51) Int. Cl.
*H04S 7/00* (2006.01)
*G06F 3/16* (2006.01)
*H04M 3/56* (2006.01)

(52) U.S. Cl.
CPC ..................................... *H04S 7/30* (2013.01)

(58) Field of Classification Search
None
See application file for complete search history.

(56) References Cited

U.S. PATENT DOCUMENTS

2010/0162119 A1 6/2010 Boustead ...................... 715/727
2017/0123752 A1 5/2017 Nadler
2018/0295463 A1 10/2018 Eronen et al.
2021/0168555 A1* 6/2021 Laaksonen .............. H04S 7/304
2021/0258690 A1 8/2021 De Bruijn et al. ................... 5/4
2023/0085918 A1* 3/2023 Ramo ................... G10L 19/008 381/303
2024/0048935 A1* 2/2024 Virolainen .............. H04S 7/303

FOREIGN PATENT DOCUMENTS

CN 111383653 A 7/2020
EP 3 595 337 A1 1/2020
JP 2008547290 A 12/2008
JP 2009049558 A 3/2009
WO WO-2017132082 A1 * 8/2017 ............ G10L 19/00

(Continued)

*Primary Examiner* — Qin Zhu

(74) *Attorney, Agent, or Firm* — McCarter & English, LLP

(57) ABSTRACT

An apparatus for rendering communication audio signal within an immersive audio scene, the apparatus including circuitry configured to: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

20 Claims, 8 Drawing Sheets

(56) References Cited

FOREIGN PATENT DOCUMENTS

| | | | | | |
|---|---|---|---|---|---|
| WO | WO-2020231883 | A1 | | 11/2020 | |
| WO | WO-2021023505 | A1 | | 2/2021 | |
| WO | WO-2021170903 | A1 | | 9/2021 | |
| WO | WO-2022074200 | A2 | * | 4/2022 | ........... G10L 19/008 |
| WO | WO-2022123108 | A1 | * | 6/2022 | ............. H04S 7/303 |

* cited by examiner

METHOD AND APPARATUS FOR COMMUNICATION AUDIO HANDLING IN IMMERSIVE AUDIO SCENE RENDERING

FIELD

The present application relates to method and apparatus for communication audio handling within augmented reality rendering, but not exclusively for method and apparatus for communication audio handling within augmented reality 6 degrees-of-freedom rendering.

BACKGROUND

Augmented Reality (AR) applications (and other similar virtual scene creation applications such as Mixed Reality (MR) and Virtual Reality (VR)) where a virtual scene is represented to a user wearing a head mounted device (HMD) have become more complex and sophisticated over time. The application may comprise data which comprises a visual component (or overlay) and an audio component (or overlay) which is presented to the user. These components may be provided to the user dependent on the position and orientation of the user (for a 6 degree-of-freedom application) within an Augmented Reality (AR) scene.

Scene information for rendering an AR scene typically comprises two parts. One part is the virtual scene information which may be described during content creation (or by a suitable capture apparatus or device) and represents the scene as captured (or initially generated). The virtual scene may be provided in an encoder input format (EIF) data format. The EIF and (captured or generated) audio data is used by an encoder to generate the scene description and spatial audio metadata (and audio signals), which can be delivered via the bitstream to the rendering (playback) device or apparatus. The scene description for an AR or VR scene is thus specified by the content creator during a content creation phase. In the case of VR, the scene is specified in its entirety and it is rendered exactly as specified in the content creator bitstream.

The second part of the AR audio scene rendering is related to the physical listening space (or physical space) of the listener (or end user). The scene or listener space information may be obtained during the AR rendering (when the listener is consuming the content). Thus there is a fundamental aspect of AR which is different from VR, which means the acoustic properties of the audio scene are known (for AR) only during content consumption and cannot be known or optimized during content creation.

FIG. 1 shows an example AR scene where a virtual scene is located within a physical listening space. In this example there is a user 107 who is located within a physical listening space 101. Furthermore in this example the user 109 is experiencing a six-degree-of-freedom (6DOF) virtual scene 113 with virtual scene elements. In this example the virtual scene 113 elements are represented by two audio objects, a first object 103 (guitar player) and second object 105 (drummer), a virtual occlusion element (e.g., represented as a virtual partition 117) and a virtual room 115 (e.g., with walls which have a size, a position, acoustic materials which are defined within the virtual scene description). A renderer (which in this example is a hand held electronic device or apparatus 111) is configured to perform the rendering so that the auralization is plausible for the user's physical listening space (e.g., position of the walls and the acoustic material properties of the wall). The rendering is presented to the user 107 in this example by a suitable headphone or headset 109.

Thus for AR scenes, the content creator bitstream carries information about which audio elements and scene geometry elements correspond to which anchors in the listening space. Consequently, the positions of the audio element positions, reflecting elements, occluding elements, etc. are known only during rendering. Furthermore, the acoustic modeling parameters are known only during rendering.

Social VR/AR is further development of such systems. Such systems are envisioned to support rendering of speech and audio from other users in the virtual environment. Additionally it is proposed that the received speech and audio communications can be rendered as immersive audio signals.

SUMMARY

There is provided according to a first aspect an apparatus comprising means configured to: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

The means may be further configured to generate at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter.

The means may be further configured to determine at least one of: an audio format associated with the communication audio signal; an allowed delay value; and a communication audio signal delay.

The means configured to determine an insertion point in a rendering processing for the determined rendering method and/or a selection of rendering elements for the determined rendering method based on the rendering processing parameter may be further configured to at least one of: determine the insertion point in the rendering processing further based on the determined at least one of: the audio format associated with the communication audio signal; the allowed delay value; and the communication audio signal delay; and determine the rendering method and/or the selection of rendering elements for the determined rendering method based on the determined at least one of: the audio format associated with the communication audio signal; the allowed delay value; and the communication audio signal delay.

The allowed delay value may be an amount of delay that is allowed for consuming the communication audio signal; and the communication audio signal delay a determined delay value based on an end-to-end delivery latency and latency rendering the communication audio.

The audio format associated with the communication audio signals may comprise one of: a unidirectional communication audio signal; and a conversational communication audio signal, between users within the immersive scene.

The means configured to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be configured to represent the communication audio signal as a higher order ambisonic audio signal.

The means may be further configured to obtain a user input, and the means configured to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be configured to generate the at least one output spatial audio signal from the at least one spatial audio signal and the communication audio signal further based on the user input wherein the user input may be configured to define at least one of: a permitted communications audio signal type; a permitted audio format; the allowed delay value; and at least one acoustic modelling preference parameter.

The means may be further configured to obtain a communication audio signal type associated with the at least one spatial audio signal, and the means configured to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be configured to generate the at least one output spatial audio signal from the at least one spatial audio signal and the communication audio signal further based on the at least one communications audio signal type associated with the at least one spatial audio signal.

The rendering processing and/or rendering elements may comprise one or more of: doppler processing; direct sound processing; material filter processing; early reflection processing; diffuse late reverberation processing; source extent processing; occlusion processing; diffraction processing; source translation processing; externalized rendering; and in-head rendering.

The means configured to determine an insertion point in a rendering processing for the determined rendering method and/or a selection of rendering elements for the determined rendering method based on the rendering processing parameter may be configured to determine a rendering mode, wherein the rendering mode comprises a value indicating the insertion point of the communication audio signal.

The value indicating the insertion point may comprise one of: a first mode value indicating the communication audio signal and the at least one spatial audio signal are inserted at the start of the rendering processing method; a second mode value indicating the communication audio signal bypasses the rendering processing and is mixed directly with an output of the rendering processing applied to the at least one spatial audio signal; and a third mode value indicating the communication audio signal is partially render processed while the rendering processing is applied in full to the at least one spatial audio signal.

The third value indicating the communication audio signal is partially render processed may be a value indicating the communication signal is direct sound rendered for point sources and binaural rendering with respect to a user position.

The means may be further configured to determine an audio format type for the communication audio signal based on the rendering processing parameter.

The means configured to determine an insertion point in the rendering processing for the determined rendering method and/or the selection of rendering elements for the determined rendering method based on the rendering processing parameter may be configured to determine the insertion point in the rendering processing for the communication audio signal within the determined rendering method based on the audio format type.

The means configured to determine the insertion point in the rendering processing for the communication audio signal within the determined rendering method based on the audio format type may be configured to determine, when the communication audio signal has an audio format type of a pre-rendered spatial audio format, that the insertion point in the rendering method is to a direct mixing with an output of the rendering processing applied to the at least one spatial audio signal.

According to a second aspect there is provided a method for an apparatus for rendering communication audio signal within an immersive audio scene, the method comprising: obtaining at least one spatial audio signal for rendering within the immersive audio scene; obtaining the communication audio signal and positional information associated with the communication audio signal; obtaining a rendering processing parameter associated with the communication audio signal; determining a rendering method based on the rendering processing parameter; determining an insertion point in a rendering processing for the determined rendering method and/or selecting rendering elements for the determined rendering method based on the rendering processing parameter.

The method may further comprise generating at least one output spatial audio signal from the at least one spatial audio signal and the communication audio signal based on the determined rendering method and insertion point in the rendering processing for the determined rendering method and/or the selecting of rendering elements for the determined rendering method based on the rendering processing parameter.

The method may further comprise determining at least one of: an audio format associated with the communication audio signal; an allowed delay value; and a communication audio signal delay.

Determining an insertion point in a rendering processing for the determined rendering method and/or selecting of rendering elements for the determined rendering method based on the rendering processing parameter may further comprise at least one of: determining the insertion point in the rendering processing further based on the determined at least one of: the audio format associated with the communication audio signal; the allowed delay value; and the communication audio signal delay; and determining the rendering method and/or the selection of rendering elements for the determined rendering method based on the determined at least one of: the audio format associated with the communication audio signal; the allowed delay value; and the communication audio signal delay.

The allowed delay value may be an amount of delay that is allowed for consuming the communication audio signal; and the communication audio signal delay a determined delay value based on an end-to-end delivery latency and latency rendering the communication audio.

The audio format associated with the communication audio signals may comprise one of: a unidirectional communication audio signal; and a conversational communication audio signal, between users within the immersive scene.

Generating the at least one output spatial audio signal from the at least one spatial audio signal and the communication audio signal based on the determined rendering method and insertion point in the rendering processing for the determined rendering method and/or selecting of rendering elements for the determined rendering method based on the rendering processing parameter may comprise representing the communication audio signal as a higher order ambisonic audio signal.

The method may further comprise obtaining a user input, and generating the at least one output spatial audio signal from the at least one spatial audio signal and the communication audio signal based on the determined rendering method and insertion point in the rendering processing for the determined rendering method and/or selecting of rendering elements for the determined rendering method based on the rendering processing parameter may comprise generating the at least one output spatial audio signal from the at least one spatial audio signal and the communication audio signal further based on the user input wherein the user input may comprise defining at least one of: a permitted communications audio signal type; a permitted audio format; the allowed delay value; and at least one acoustic modelling preference parameter.

The method may further comprise obtaining a communication audio signal type associated with the at least one spatial audio signal, and generating the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may comprise generating the at least one output spatial audio signal from the at least one spatial audio signal and the communication audio signal further based on the at least one communications audio signal type associated with the at least one spatial audio signal.

The rendering processing and/or rendering elements may comprise one or more of: doppler processing; direct sound processing; material filter processing; early reflection processing; diffuse late reverberation processing; source extent processing; occlusion processing; diffraction processing; source translation processing; externalized rendering; and in-head rendering.

Determining an insertion point in a rendering processing for the determined rendering method and/or selecting rendering elements for the determined rendering method based on the rendering processing parameter may comprise determining a rendering mode, wherein the rendering mode comprises a value indicating the insertion point of the communication audio signal.

The value indicating the insertion point may comprise one of: a first mode value indicating the communication audio signal and the at least one spatial audio signal are inserted at the start of the rendering processing method; a second mode value indicating the communication audio signal bypasses the rendering processing and is mixed directly with an output of the rendering processing applied to the at least one spatial audio signal; and a third mode value indicating the communication audio signal is partially render processed while the rendering processing is applied in full to the at least one spatial audio signal.

The third value indicating the communication audio signal is partially render processed may be a value indicating the communication signal is direct sound rendered for point sources and binaural rendering with respect to a user position.

The method may further comprise determining an audio format type for the communication audio signal based on the rendering processing parameter.

Determining an insertion point in the rendering processing for the determined rendering method and/or selecting of rendering elements for the determined rendering method based on the rendering processing parameter may comprise determining the insertion point in the rendering processing for the communication audio signal within the determined rendering method based on the audio format type.

Determining the insertion point in the rendering processing for the communication audio signal within the determined rendering method based on the audio format type may comprise determining, when the communication audio signal has an audio format type of a pre-rendered spatial audio format, that the insertion point in the rendering method is to a direct mixing with an output of the rendering processing applied to the at least one spatial audio signal.

According to a third aspect there is provided an apparatus comprising at least one processor and at least one memory including a computer program code, the at least one memory and the computer program code configured to, with the at least one processor, cause the apparatus at least to: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

The apparatus may be further caused to generate at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter.

The apparatus may be further caused to determine at least one of: an audio format associated with the communication audio signal; an allowed delay value; and a communication audio signal delay.

The apparatus caused to determine an insertion point in a rendering processing for the determined rendering method and/or a selection of rendering elements for the determined rendering method based on the rendering processing parameter may be further caused to least one of: determine the insertion point in the rendering processing further based on the determined at least one of: the audio format associated with the communication audio signal; the allowed delay value; and the communication audio signal delay; and determine the rendering method and/or the selection of rendering elements for the determined rendering method based on the determined at least one of: the audio format associated with the communication audio signal; the allowed delay value; and the communication audio signal delay.

The allowed delay value may be an amount of delay that is allowed for consuming the communication audio signal; and the communication audio signal delay a determined delay value based on an end-to-end delivery latency and latency rendering the communication audio.

The audio format associated with the communication audio signals may comprise one of: a unidirectional communication audio signal; and a conversational communication audio signal, between users within the immersive scene.

The apparatus caused to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be caused to represent the communication audio signal as a higher order ambisonic audio signal.

The apparatus may be further caused to obtain a user input, and the apparatus caused to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be caused to generate the at least one output spatial audio signal from the at least one spatial audio signal and the communication audio signal further based on the user input wherein the user input may be caused to define at least one of: a permitted communications audio signal type; a permitted audio format; the allowed delay value; and at least one acoustic modelling preference parameter.

The apparatus may be caused to obtain a communication audio signal type associated with the at least one spatial audio signal, and the apparatus caused to generate the at least one output spatial audio signal from the at least one spatial audio signal and the communication audio signal based on the determined rendering method and insertion point in the rendering processing for the determined rendering method and/or a selection of rendering elements for the determined rendering method based on the rendering processing parameter may be caused to generate the at least one output spatial audio signal from the at least one spatial audio signal and the communication audio signal further based on the at least one communications audio signal type associated with the at least one spatial audio signal.

The rendering processing and/or rendering elements may comprise one or more of: doppler processing; direct sound processing; material filter processing; early reflection processing; diffuse late reverberation processing; source extent processing; occlusion processing; diffraction processing; source translation processing; externalized rendering; and in-head rendering.

The apparatus caused to determine an insertion point in a rendering processing for the determined rendering method and/or a selection of rendering elements for the determined rendering method based on the rendering processing parameter may be caused to determine a rendering mode, wherein the rendering mode comprises a value indicating the insertion point of the communication audio signal.

The value indicating the insertion point may comprise one of: a first mode value indicating the communication audio signal and the at least one spatial audio signal are inserted at the start of the rendering processing method; a second mode value indicating the communication audio signal bypasses the rendering processing and is mixed directly with an output of the rendering processing applied to the at least one spatial audio signal; and a third mode value indicating the communication audio signal is partially render processed while the rendering processing is applied in full to the at least one spatial audio signal.

The third value indicating the communication audio signal is partially render processed may be a value indicating the communication signal is direct sound rendered for point sources and binaural rendering with respect to a user position.

The apparatus may be further caused to determine an audio format type for the communication audio signal based on the rendering processing parameter.

The apparatus caused to determine an insertion point in the rendering processing for the determined rendering method and/or the selection of rendering elements for the determined rendering method based on the rendering processing parameter may be caused to determine the insertion point in the rendering processing for the communication audio signal within the determined rendering method based on the audio format type.

The apparatus caused to determine the insertion point in the rendering processing for the communication audio signal within the determined rendering method based on the audio format type may be caused to determine, when the communication audio signal has an audio format type of a pre-rendered spatial audio format, that the insertion point in the rendering method is to a direct mixing with an output of the rendering processing applied to the at least one spatial audio signal.

According to a fourth aspect there is provided an apparatus comprising: means for obtaining at least one spatial audio signal for rendering within the immersive audio scene; means for obtaining the communication audio signal and positional information associated with the communication audio signal; means for obtaining a rendering processing parameter associated with the communication audio signal; means for determining a rendering method based on the rendering processing parameter; means for determining an insertion point in a rendering processing for the determined rendering method and/or a selection of rendering elements for the determined rendering method based on the rendering processing parameter.

According to a fifth aspect there is provided a computer program comprising instructions [or a computer readable medium comprising program instructions] for causing an apparatus to perform at least the following: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

According to a sixth aspect there is provided a non-transitory computer readable medium comprising program instructions for causing an apparatus to perform at least the following: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

According to a seventh aspect there is provided an apparatus comprising: obtaining circuitry configured to obtain at least one spatial audio signal for rendering within the immersive audio scene; obtaining circuitry configured to obtain the communication audio signal and positional information associated with the communication audio signal; obtaining circuitry configured to obtain a rendering processing parameter associated with the communication audio signal; determining circuitry configured to determine a rendering method based on the rendering processing parameter; determining circuitry configured to determine an insertion point in a rendering processing for the determined rendering method and/or a selection of rendering elements for the determined rendering method based on the rendering processing parameter.

According to an eighth aspect there is provided a computer readable medium comprising program instructions for causing an apparatus to perform at least the following: obtain at least one spatial audio signal for rendering within the immersive audio scene; obtain the communication audio signal and positional information associated with the communication audio signal; obtain a rendering processing parameter associated with the communication audio signal; determine a rendering method based on the rendering processing parameter; determine an insertion point in a rendering processing for the determined rendering method and/or a selection of rendering elements for the determined rendering method based on the rendering processing parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
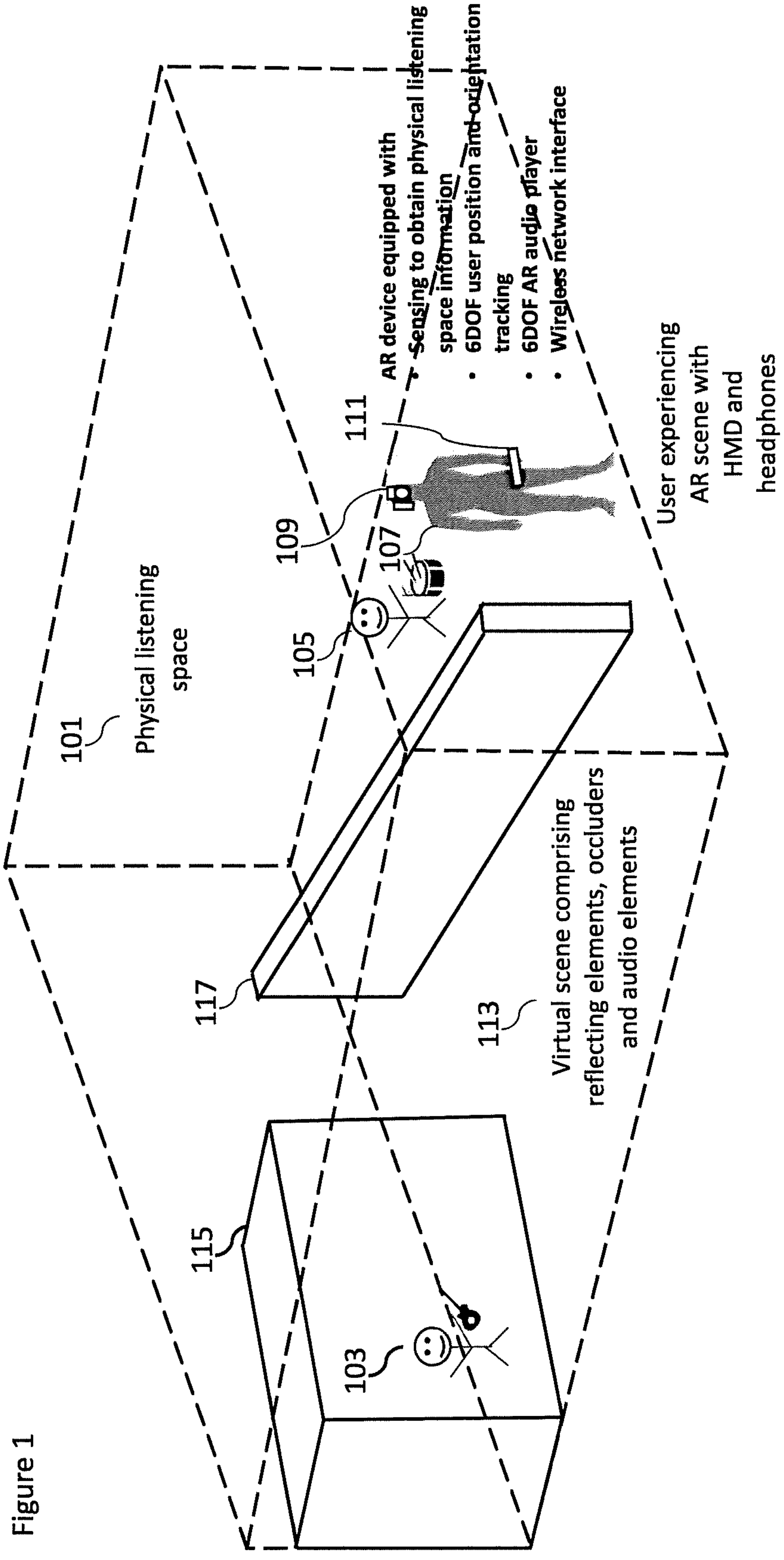
FIG. 1 shows schematically a suitable environment showing an example of a combination of virtual scene elements within a physical listening space.

The following describes in further detail suitable apparatus and possible mechanisms for rendering an augmented (AR) scene experience and providing immersive audio communication handling capability As discussed above it is envisioned that "social VR" will be a requirement specified for MPEG-I 6DoF Audio standardization. The requirements are envisioned as being that the system shall support rendering of speech and audio from other users in the virtual environment. The speech and audio may be immersive. Additionally in some embodiments the apparatus and methods are envisioned to support low-latency conversation between users within a given virtual environment. Furthermore the apparatus and methods should be required to support low-latency conversation between a user within the given virtual environment and a user outside the given virtual environment.

Additionally the apparatus and methods should enable synchronization of audio and video of users and the scene and further support metadata specifying restrictions and recommendations for rendering of speech/audio from the other users (e.g. on placement and sound level).

The embodiments as discussed herein thus implement a low-delay communications solution, for example, 3GPP EVS/IVAS, and are able to interface with or implement MPEG-I 6DoF rendering.

A difference between the immersive audio signals used in 6DoF scene rendering and the communication audio signals can be in terms of the decoding and rendering latencies, different delivery mechanism and differing consumption constraints. Streaming or content distribution latency (e.g., as obtained with DASH) is expected or acceptable for 6DoF immersive audio delivery, because these are not low latency delivery methods. On the other hand, for communication audio, conversational or low latency is typically required.

Communication audio rendering in immersive audio scenes (MPEG Immersive Audio) is inherently dynamic, and thus pre-conceived rendering properties may not always be sufficient. This is because the communication audio delay budget is dependent on several factors. One important factor is the use case (is the communication an unidirectional commentary, a bidirectional conversation, etc.), with the need for different delay constraints depending on the use case. The other factor is the network conditions for the communication audio, which may vary for different usage instances within a single virtual immersive audio consumption session or for different consumption sessions. The change in network conditions can result in actual rendering delay budget to be different at different times.

This can be considered to be analogous to the AR situation where the consumption scene is unknown, however, communication audio handling is furthermore dynamic and can significantly vary over time. Thus for communication audio, the delay budget (e.g., specified in EIF or via any higher level module may be known) can be known or estimated during content creation. However, the communication audio delay parameters will almost always differ (e.g., end to end delay, jitter, etc.) and be unknown during content creation. In an embodiment of the invention, the content creator delay budget parameter can be in a form which implicitly signals the budget by indicating the mode of rendering communication audio. For example, a value of 0 indicates the communication audio is routed through the start of the entire immersive audio rendering pipeline, a value of 1 indicates the communication audio bypasses the entire rendering pipeline and is mixed directly in the last stage, a value of 2 indicates the communication audio passes through minimal rendering (e.g., direct sound rendering for point source and binaural rendering in the specified position).

The concept as discussed in the embodiments hereafter in further detail is for apparatus and methods configured to render audio signals to a listener or user in a reliable manner even when there are varying delays, implementation specific delay differences which are not perceived significantly during streaming based consumption of 6DoF scene data. These embodiments are configured to be able to implement conversational usage scenarios (as streaming based consumption is less sensitive to latency than conversational usage).

In the following discussions an allowed delay budget is the amount of delay that is allowed for consuming the received communication audio. Typically this consists of end to end delivery latency and latency for rendering the communication audio in the 6DoF immersive audio scene. In the following this term is used interchangeably with permitted latency values. Additionally in the following network variations refers to changes in end to end network delivery which can be based on latency, jitter, etc.

The embodiments as discussed as follows relate to rendering of communication audio within a 6-degree-of-freedom (i.e., the listener can move within the scene and the listener position and orientation is tracked) immersive audio scene where apparatus and methods are described configured to ensure a desired (e.g., player, user or content creator specified) rendering of the received communication audio within an immersive audio scene despite of the dynamic nature of the communication audio due to network variations as well as immersive audio scene dependent characteristics. This can in some embodiments be achieved by obtaining, from a bitstream associated with at least one spatial audio signal, and position information associated with an incoming communication audio (this can for example be a placeholder in EIF saying where to 'locate' the communications audio). In another embodiment, the communication audio placeholder can be added to any audio element such as audio object source, channel source or HOA source. The properties of audio elements for each of the signal type (HOA, Object, Channel) can be added to such a communication audio placeholder. In some embodiments the apparatus and methods can furthermore be configured to obtain an allowed delay budget associated with the communication audio (e.g., obtained from system, unidirectional or bidirectional or from EIF). Additionally in some embodiments the apparatus and methods are configured to obtain an audio format associated with the communication audio based on the allowed delay. The embodiments may furthermore be configured to determine an appropriate insertion point in the rendering pipeline based on the allowed delay, communication audio format, communication audio delay and audio rendering pipeline declaration (in other words to derive where in the audio signal pipeline the communication audio is received for processing). The apparatus and methods according to some embodiments are further configured to determine, based on at least one of the determined allowed delay, communication audio delay and audio format, at least one processing method and spatial rendering parameter for the communication audio.

Thus in some embodiments the processing method relates to the selection of the communication audio processing depending on the signal type (e.g., whether the signal type is an object format signal, a HOA signal, or channel format signal) and the rendering parameter then can refer to indicate one or more of the rendering approaches to be applied. For example, rendering parameter may indicate that the rendering stages are to employ point source rendering of direct sound and binaural rendering of audio objects.

In some further embodiments the rendering parameter can indicate or be used to control other elements of the rending process. For example in some embodiments the rendering parameters can be employed to indicate the selection or skipping of rendering stages. Thus in some embodiments based on a certain insertion point within the rending processing operations, the start of the rendering follows a certain sequence depending on the audio rendering pipeline stage sequence. However, the rendering parameters can be employed to indicate skipping of some intermediate stages in the rendering processing sequence.

In some embodiments where the communication audio signals are represented as a higher order ambisonics (HOA) format, whether it is rendered as a single-point HOA with internal translation or whether it is rendered as 3DoF HOA, depends on the allowed rendering delay. In some embodiments the communication audio is implemented as an audio object or channel and the amount of acoustic modeling performed for the audio object is dependent on the network delay and allowed consumption delay.

In some embodiments the communication audio rendering is adapted according to the immersive audio scene player preferences. These preferences comprise at least one of the following aspects:

- Permitted communication audio type (e.g., unidirectional, conversational, between users consuming same 6DoF scene, etc.);
- Permitted communication audio format (e.g., audio object, channel, 3DoF HOA, single HOA with translation);
- Allowed delay for communication audio rendering; and
- Acoustic modeling preferences In some embodiments depending on the delay preferences, the communication audio is input and processed via a 6DoF audio rendering pipeline or can be mixed separately.

For example, if the immersive audio scene is configured to put the communication audio signal which has maximal acoustic merge with the immersive audio scene but delay budget requires that certain features such as diffraction, occlusion are not possible, the audio object path is determined by the renderer to minimize the occurrence of occlusion or diffraction.

Figure 2:
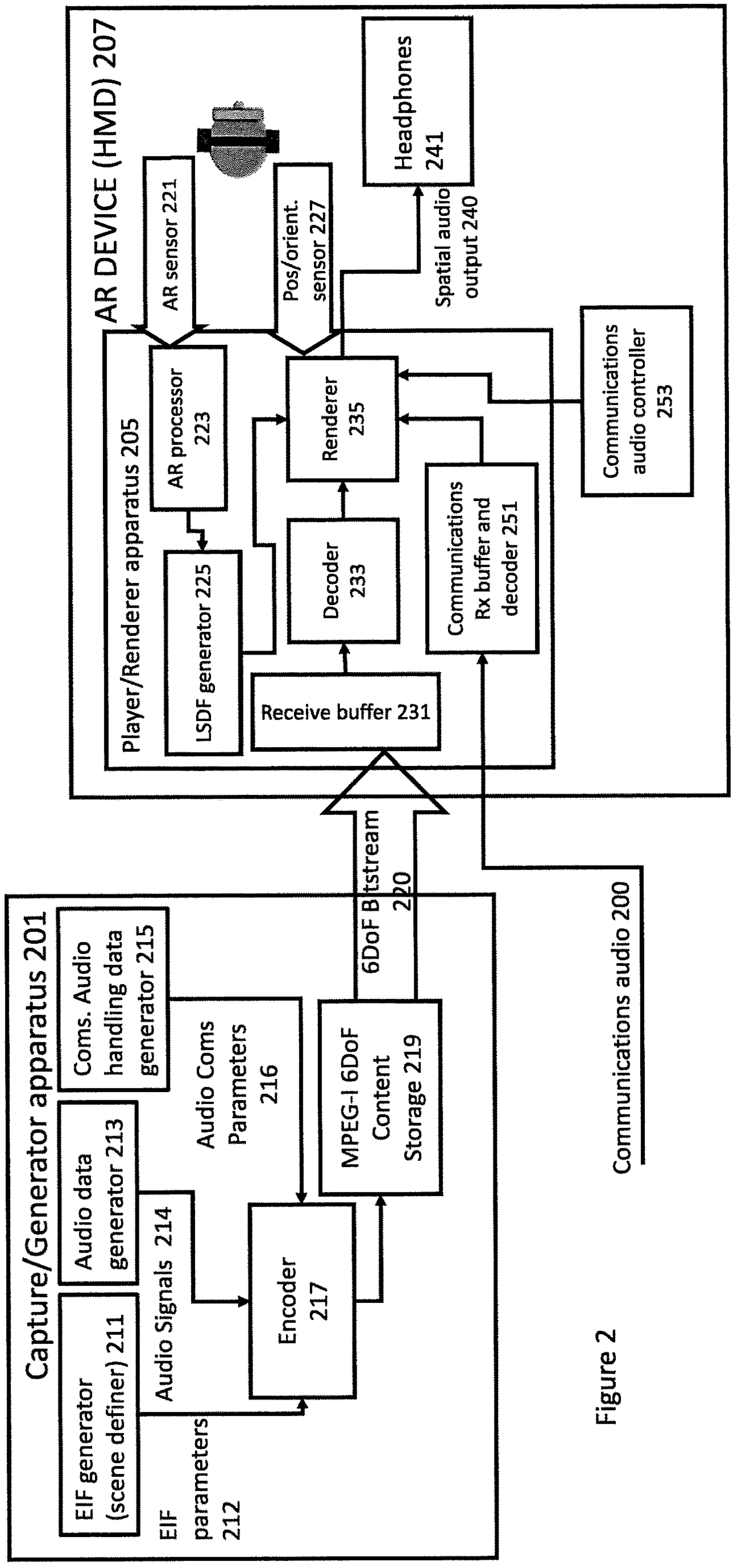
FIG. 2 shows schematically a system of apparatus for implementing an example capture to rendering for an augmented reality scene according to some embodiments.

FIG. 2 gives an overview of the end to end AR/XR 6DoF audio system. There are shown in the example three parts of the system, the capture/generator apparatus 201 configured to capture/generate and store/transmit the audio information and associated metadata and the augmented reality (AR) device 207 configured to output a suitable processed audio signal based on the audio information and associated metadata. The AR device 207 in the example shown in FIG. 2 has the 6DoF audio player 205 which renders retrieves the 6DoF bitstream from the storage/distribution apparatus 203 and renders it.

In some embodiments as shown in FIG. 2 the capture/generator apparatus 201 comprises an encoder input format (EIF) generator 211. The encoder input format (EIF) generator 211 (or in more general the scene definer) is configured to define the 6DoF audio scene. In some embodiments the scene may be described by the EIF (encoder input format) or any other suitable 6DoF scene description format. The EIF also references the audio data comprising the audio scene. The encoder input format (EIF) generator 211 is configured to create EIF (Encoder Input Format) data, which is the content creator scene description. The scene description information contains virtual scene geometry information such as positions of audio elements. Furthermore the scene description information may comprise other associated metadata such as directivity and size and other acoustically relevant elements. For example the associated metadata could comprise positions of virtual walls and their acoustic properties and other acoustically relevant objects such as occluders. An example of acoustic property is acoustic material properties such as (frequency dependent) absorption or reflection coefficients, amount of scattered energy, or transmission properties. In some embodiments, the virtual acoustic environment can be described according to its (frequency dependent) reverberation time or diffuse-to-direct sound ratio. The EIF generator 211 in some embodiments may be more generally known as a virtual scene information generator. The EIF parameters 214 can in some embodiments be provided to a suitable (MPEG-I) encoder 217.

In some embodiments the capture/generator apparatus 201 comprises an audio content generator 213. The audio content generator 213 is configured to generate the audio content corresponding to the audio scene. The audio content generator 213 in some embodiments is configured to generate or otherwise obtain audio signals associated with the virtual scene. For example in some embodiments these audio signals may be obtained or captured using suitable microphones or arrays of microphones, be based on processed captured audio signals or synthesised. In some embodiments the audio content generator 213 is furthermore configured in some embodiments to generate or obtain audio parameters associated with the audio signals such as position within the virtual scene, directivity of the signals. The audio signals and/or parameters 212 can in some embodiments be provided to a suitable (MPEG-I) encoder 217.

In some embodiments the capture/generator apparatus 201 comprises a communications audio handling data generator 215. The communications audio handling data generator 215 is configured to generate information which can be carried in the content creator bitstream to indicate what type (e.g., conversational, unidirectional, etc.) of communication audio is allowed for this particular immersive audio scene. For example, some content creators may allow incoming communication audio call from any caller, allow only communication audio from other users who are consuming the same 6DoF audio content, allow communication audio between any two users consuming any 6DoF audio content. Furthermore, the content creator bitstream carries information regarding which rendering stages are allowed, which ones are disallowed.

In some implementation embodiments, the communication audio handling parameters can be device profile preference, application settings or user preference configuration dependent.

For example in some embodiments the parameters can be implemented within a structure such as an ObjectSourceCAStruct( ). The ObjectSourceCAStruct( ) structure is an extension of the audio object metadata. In some embodiments, this structure can appear as a structure within the audio object metadata. Although the examples below refer to audio object, the same can be extended to make a communication audio structure for HOA or channels.

```
aligned (8) ObjectSourceCAStruct ( ) {
  unsigned int (16) object_audio_identifier;//object audio
index
  unsigned int (1) ca_prototype_flag; //commmunication audio
prototype flag
  unsigned int (1) active;//active or inactive flag
  unsigned int (1) hasExtent;
  unsigned int (32) gainDB;
  unsigned int (32) referenceDistance;
  bit (5) reserved = 0;
  if(ca_prototype_flag) {
  unsigned int (1) exclude_clustering_flag;//communication
audio is excluded from clustering
  bit (7) reserved = 0;
    CommunicationAudioIngestionStruct ( ) ;
    DynamicIndexStruct ( );
  } else {
    MPEGHDecodedAudioIndex;//index to obtain MPEG-H encoded
audio stream
    Location ( );
    if (hasExtent)
      ExtentStruct ( );
  }
}
aligned (8) DynamicIndexStruct ( ){
  unsigned int (16) stream_identifier;//dynamic ID allocated by
renderer/player for the communication audio
}
aligned (8) Location( ){
  signed int (32) pos_x;
  signed int (32) pos_y;
  signed int (32) pos_z;
  signed int (32) orient_yaw;
  signed int (32) orient_pitch;
  signed int (32) orient_roll;
  unsigned int (1) cspace;//with respect to listening space
origin if 1 with respect to user if 0
  bit (7) reserved = 0;
}
```

The presence of ca_prototype_flag equal to 1 indicates to the player that it should be prepared to receive communication audio. The communication audio ingestion related information is described by the CommunicationAudioIngestionStruct( ) which also has information regarding the type (s) of communication audio that is allowed or permitted for the 6DoF audio scene. Furthermore, a flag exclude_clustering_flag to indicate whether clustering can be performed with communication audio. In absence of this flag, clustering is disabled by default. These communication audio types can be bidirectional, unidirectional, bidirectional, between users consuming the same content, between users consuming different content. The ingestion structure also carries information regarding the required (RequiredRenderingStagesStruct( )) and disallowed (DisallowedRenderingStagesStruct( )) render stages. Furthermore, rendering_modes can also be presented in a compact manner the need for communication audio to be processed through the immersive audio rendering pipeline or be bypassed entirely. In case of latter, the communication audio is rendered outside the immersive rendering pipeline and mixed with the immersive audio content rendering pipeline output. If the rendering_modes_present flag value is absent or is equal to 0, the rendering is performed according to the communication audio signal element properties. Typically, if ca_rendering_modes_present value is 1, the other data structures such as RequiredRenderingStagesStruct( ), DisallowedRenderingStagesStruct( ) and ca_rendering_max_latency need not be present.

```
aligned (8) CommunicationAudioIngestionStruct ( ) {
  unsigned int (1) ca_co_conversational_allowed;//bidirectional
call with another user in the same 6DoF immersive audio scene
  unsigned int (1) ca_co_oneway_allowed;//commentary from
another user in the same 6DoF immersive audio scene
  unsigned int (1) ca_conversational_allowed;//bidirectional
call
  unsigned int (1) ca_oneway_allowed;//commentary
  if (ca_co_conversational_allowed) {
    unsigned int (1) ca_delay_threshold_present;
    unsigned int (l) required_stages_present;
    unsigned int (1) disallowed_rendering_stages_present;
    unsigned int (1) ca_rendering_modes_present;
    bit (4) reserved = 0;
    if(ca_delay_threshold_present)
      unsigned int (32) ca_rendering_maxlatency;
    if(required_stages_present)
      RequiredRenderingStagesStruct ( );
    if(disallowed_stages_present)
      DisallowedRenderingStagesStruct ( ) ;
    if(ca_rendering_modes_present)
      unsigned int (8) rendering_modes_type;
  }
    if(ca_co_oneway_allowed){
    unsigned int (1) ca_delay_threshold_present;
    unsigned int (1) required_stages_present;
    unsigned int (1) disallowed_rendering_stages_present;
    unsigned int (1) ca_rendering_modes_present;
    bit(4) reserved = 0;
    if(ca_delay_threshold_present)
      unsigned int (32) ca_rendering_maxlatency;
  if(required_stages_present)
      RequiredRenderingStagesStruct ( );
  if(disallowed_stages_present)
      DisallowedRenderingStagesStruct ( ) ;
  if(ca_rendering_modes_present)
      unsigned int (8) rendering_modes_type;
  }
    if(ca_oneway_allowed){
    unsigned int (1) ca_delay_threshold_present;
    unsigned int (1) required_stages_present;
    unsigned int (1) disallowed_rendering_stages_present;
    unsigned int (1) ca_rendering_modes_present;
    bit (4) reserved = 0;
    if(ca_delay_threshold_present)
      unsigned int (32) ca_rendering_maxlatency;
    if(required_stages_present)
      RequiredRenderingStagesStruct ( ) ;
    if(disallowed_stages_present)
      DisallowedRenderingStagesStruct ( ) ;
    if(ca_rendering_modes_present)
      unsigned int (8) rendering_modes_type;
  }
  if(ca_conversational_allowed){
    unsigned int (1) ca_delay_threshold_present;
    unsigned int (1) required_stages_present;
    unsigned int (1) disallowed_rendering_stages_present;
    unsigned int (1) ca_rendering_modes_present;
    bit (4) reserved = 0;
    if(ca_delay_threshold_present)
      unsigned int (32) ca_rendering_maxlatency;
    if(required_stages_present)
      RequiredRenderingStagesStruct ( );
    if(disallowed_stages_present)
      DisallowedRenderingStagesStruct ( );
    if(ca_rendering_modes_present)
      unsigned int (8) rendering_modes_type;
  }
}
  aligned (8) RequiredRenderingStagesStruct(){
  unsigned int (8) num_stages;
  for(i=0;i<num_stages;i++){
    unsigned int (8) rendering_stage_idx;
  }
}
  aligned (8) DisallowedRenderingStagesStruct () {
  unsigned int (8) num_stages;
  for(i=0;i<num_stages;i++){
```

-continued

```
    unsigned int (8) rendering_stage_idx;
  }
}
```

| rendering_stage_idx | Value |
|---|---|
| 0 | Diffuse late reverberation |
| 1 | Early reflections |
| 2 | Source extent |
| 3 | Occlusion |
| 4 | Diffraction |
| 5 | Doppler |
| 6 | Internal source translation |
| 7 | Externalized rending |
| 8 | Non-externalized or in-head rendering |
| 9 | Same acoustic environment |
| 10-255 | Reserved |

| rendering_modes | Value |
|---|---|
| 0 | All rendering stages included as specified by the audio object for communication audio properties. |
| 1 | All rendering stages bypassed with external rendering of communication audio signal with only mixing with immersive audio in last stage. |
| 2 | Rendering with point source in the specified position with binaural rendering for externalization of the rendered audio |
| 3 | Rendering of the communication audio object as a point source without reverb modeling |
| 4 | Rendering of the communication audio object without distance rendering or doppler in spite of fast user movement. |
| 2-255 | Reserved |

In an embodiment of the implementation, in addition to the rendering stages, the MPEG-H decoding latency is also considered in order to determine the permissible delay threshold for communication audio rendering in an MPEG-I Immersive audio scene. The decoding delay may depend on the audio format of the audio elements in the MPEG-1 immersive audio scene.

In some embodiments the capture/generator apparatus 201 comprises an encoder 217. The encoder is configured to receive the EIF parameters 212, communication audio handling parameters 216, and the audio signals/audio parameters 214 and encode these to generate a suitable bitstream.

The encoder 217 for example can uses the EIF parameters 212, communication audio handling parameters 216 and the audio signals/audio parameters 214 to generate the MPEG-I 6DoF audio scene content which is stored in a format which can be suitable for streaming over the network. The delivery can be in any suitable format such as MPEG-DASH (Dynamic Adaptive Streaming Over HTTP), HLS (HTTP Live Streaming), etc. The 6DoF bitstream carries the MPEG-H encoded audio content and MPEG-I 6DoF bitstream. The content creator bitstream generated by the encoder on the basis of EIF and audio data can be formatted and encapsulated in a manner analogous to MHAS packets (MPEG-H 3D audio stream). The encoded bitstream in some embodiments is passed to a suitable content storage module 219. For example as shown in FIG. 2 the encoded bitstream is passed to a MPEG-I 6DoF content storage 219 module.

Although in this example the encoder 217 is located within the capture/generator apparatus 201 it would be understood that the encoder 217 can be separate from the capture/generator apparatus 201.

In some embodiments the capture/generator apparatus 201 comprises a content storage module. For example as shown in FIG. 2 the encoded bitstream is passed to a MPEG-I 6DoF content storage 219 module. In such embodiments the audio signals are transmitted in a separate data stream to the encoded parameters. In some embodiments the audio signals and parameters are stored/transmitted as a single data stream or format.

The content storage 219 is configured to store the content (including the EIF derived content creator bitstream with communication audio handling parameters) and provide it to the AR device 207.

In some embodiments the AR device 207 which may comprise a head mounted device (HMD) is the playback device for AR consumption of the 6DoF audio scene.

The AR device 207 in some embodiments comprises at least one AR sensor 221. The at least one AR sensor 221 may comprise multimodal sensors such as visual camera array, depth sensor, LiDAR, etc. The multimodal sensors are used by the AR consumption device to generate information of the listening space. This information can comprise material information, objects of interest, etc. This sensor information can in some embodiments be passed to an AR processor 223.

The AR device 207 in some embodiments comprises at least one position/orientation sensor 227. The at least one position/orientation sensor 227 may comprise any suitable sensor or sensors configure to determine the position and/or orientation of the listener within the physical listening space. For example the sensors may comprise digital compass/gyroscopes, positioning beacons etc. In some embodiments the sensors employed in the AR sensor 221 is furthermore used to determine orientation and/or position of the listener. This sensor information can in some embodiments be passed to a renderer 235.

The AR device 207 in some embodiments comprises an input configured to receive communications audio 200.

Additionally in some embodiments the AR device 207 comprises a communication audio controller 253. The communications audio controller 253 is configured to output control information to the renderer 235 and control the integration of the communications audio 200 with the interactive audio (which may be part of the bitstream 220). The communication audio controller 253 in some embodiments is configured to generate information in the format described below or any other suitable format. In some embodiments this information is in the form of a rendering stage declaration which can signal a desired order such that any of the processing stages can be skipped without causing any repeat processing or undesired output for the subsequent render processing. The rendering pipeline declaration in some embodiments is available to the scene management processor. An example structure for the information can be:

```
aligned (8) RenderingStagesInfoStruct ( ) {
unsigned int (8) num_stages;
for(i=0;i<num_stages;i++){
   unsigned int (8) render_stage_idx;
   unsigned int (32) mean_delay_value;
   unsigned int (32) sd_delay_value;
   unsigned int (8) input_audio_type;
  }
}
```

In some embodiments the rendering stages of the auralization pipeline are listed and the value of mean_delay_value and sd_delay_value is −1 if it is not available.

In some embodiments the communications audio controller 253 is configured to generate the control information such as format, delivery latency and jitter of the communication audio. In some embodiments this information can be predetermined values which are stored within the renderer and thus where the controller 253 is absent or not providing this information the render is configured to use the default values. For example class type latency values can be predetermined default values used by the renderer. In some embodiments the control information can be passed in the following structure:

```
aligned (8) CommunicationAudioInfoStruct ( ) {
unsigned int (4) ca_class_type;
unsigned int (4) ca_format_type;
unsigned int (32) ca_delivery_latency;
}
```

| ca_class_ type | Value | Permitted end-to-end latency values (examples) |
|---|---|---|
| 0 | One way incoming speech | 400 ms |
| 1 | Two way communication speech | 200 ms |
| 2 | One way coupled audio (both users are in the same immersive audio scene) | 120 ms |
| 3 | Two way coupled audio (both users are in the same immersive audio scene) | 80 ms |
| 4-15 | Reserved | |

| ca_format_type | Value | Examples |
|---|---|---|
| 0 | Mono | AMR-NB, AMR-WB, EVS, etc. |
| 1 | spatial audio transformed to HOA | Spatial audio captured as MASA |
| 3 | Pre-rendered spatial audio | Rendering performed in IVAS decoder/renderer or external renderer supporting IVAS interface |
| 2-15 | Reserved | Additional formats including pre-rendered spatial audio |

If the communication audio format is 0 or 1, it is input as communication audio by the immersive audio rendering pipeline. However, in case of pre-rendered spatial audio, the communication audio is input directly to the mixer block.

In another embodiment, the communication audio handling is embedded within the audio element metadata which is specified for the objects, channels and HOA sources. Consequently, the communication audio can be rendered by the MPEG-I renderer as any other audio element with communication audio specific properties. These communication audio specific rendering preferences are specified as control data to select and/or reject the one or more rendering stages.

```
aligned (8) ObjectSourceStruct ( ){
  unsigned int (16) index;//object audio index
  unsigned int (1) ca_flag;//placeholder for rendering
communication audio as audio object
  unsigned int (1) active;//active or inactive flag
  unsigned int (1) hasExtent;
  unsigned int (32) gainDB;
  unsigned int (32) referenceDistance;
  bit (5) reserved = 0;
  if(ca_flag){
    CommunicationAudioRenderingStruct ( ) ;
    unsigned int (16) CommunicationAudioIndex;// Identifier
to receive the communication audio stream
  } else {
    unsigned int (16) MPEGHDecodedAudioIndex;//index to
obtain MPEG-H encoded audio stream
    Location ( );//index to obtain MPEG-H encoded audio
stream
  }
  if(hasExtent)
    ExtentStruct ( );
aligned (8) CommunicationAudioRenderingStruct ( ){
  unsigned int (1) rendering_modes_present;
  unsigned int (1) dynamic_modes_;
  if(rendering_modes_present){
    unsigned int(8) rendering_modes;
  bit (7) reserved = 0;
}
```

The ObjectSourceStruct( ), the ObjectSourceCAStruct( ), or any of their constituent parameters or structures can vary over a duration of the audio scene. Consequently, the communication audio in some embodiments may be allowed or disallowed depending on the prevailing metadata information. Furthermore, the rendering mode or insertion points may vary over duration of the audio scene.

In yet another embodiment, the communication audio metadata, for example, the audio element metadata described above which is a placeholder for the communication audio, carries an indication flag communicationAudioRenderImmediateFlag.

If communicationAudioRenderImmediateFlag==0, the communication audio is rendered or mixed immediately into the rendered immersive audio scene without additional delay.

If the communicationAudioRenderImmediateFlag==1, the communication audio is rendered according to the rendering metadata and properties specified for the audio element.

The communication audio metadata can also be delivered as a dynamic update to the renderer. The communication audio can be delivered as a new MHAS packet with PACTYP_CAAUDIODATA, the label can be used to indicate the corresponding metadata and dynamic update metadata applicable to the PACTYP_CAAUDIODATA. The PACTYP_CAAUDIODATA packet carries the payload ObjectSourceStruct( ), HOASourceStruct( ), ChannelSource Struct( ) or a subset of those structures along with the communication audio rendering or ingestion parameters.

In one implementation example, the PACTYP_CAAUDIODATA carries audio data in the form of PCM. Consequently, the PACTYP_CAAUDIODATA is followed by PACTYP_PCMCONFIG and PACTYP_PCMDATA. The preceding PACTYP_CAAUDIODATA packet enables the renderer to identify the PCM data to be corresponding to the communication audio data.

In some embodiments the AR device 207 comprises a suitable output device. In the example shown in FIG. 2 the output device is shown as headphones 241 configured to receive the spatial audio output 240 generated by the renderer 235 but any suitable output transducer arrangement may be employed.

In some embodiments the AR device 207 comprises a player/renderer apparatus 205. The player/renderer apparatus 205 is configured to receive the bitstream comprising the EIF derived content creator bitstream 220, the AR sensor information, the user position and/or orientation information, the communications audio 220 and the control information from the communications audio controller and from this information determine a suitable spatial audio output 240 which is able to be passed to a suitable output device, which in FIG. 2 is shown as headphones 241 (which may be incorporated within the AR device 207.

In some embodiments the player/renderer apparatus 205 comprises an AR processor 223. The AR processor 223 is configured to receive the sensor information from the at least one AR sensor 221 and generate suitable AR information which may be passed to the LSDF generator 225. For example, in some embodiments, the AR processor is configured to perform a fusion of sensor information from each of the sensor types.

In some embodiments the player/renderer apparatus 205 comprises a listening space description file (LSDF) generator 225. The listening space description file (LSDF) generator 225 is configured to receive the output of the AR processor 223 and from the information obtained from the AR sensing interface generate the listening space description for AR consumption. The format of the listening space can be in any suitable format. The LSDF creation can use the LSDF format. This description carries the listening space or room information including acoustic properties (e.g., mesh enveloping the listening space including materials for the mesh faces), spatially variable elements of the scene which are referred to as anchors in the listening space description. The LSDF generator is configured to output this listening scene description information to the renderer 235.

In some embodiments the player/renderer apparatus 205 comprises a receive buffer 231 configured to receive the content creator bitstream (comprising the EIF information) 220. The buffer 231 is configured to pass the received data and pass the data to a decoder 233.

In some embodiments the player/renderer apparatus 205 comprises a decoder 233 configured to obtain the encoded bitstream from the buffer 231 and output decoded EIF information and communication audio handling parameters (with decoded audio data when it is within the same data stream) to the renderer 235.

In some embodiments the player/renderer apparatus 205 comprises a communications receiver buffer and decoder 251. The communications receiver buffer and decoder 251 is configured to receive the communications audio 200 and decode the encoded audio data and pass it to the renderer 235.

In some embodiments the player/renderer apparatus 205 comprises a renderer 235. The renderer 235 is configured to receive the decoded EIF information (with decoded immersive audio data when it is within the same data stream), the listening scene description information, listener position and/or orientation information, decoded communications audio and communications audio control information. The renderer 235 is configured to generate spatial audio output signals and pass these to the output device, as shown in FIG. 2 by the spatial audio output 240 to the headphones 241.

Figure 3:
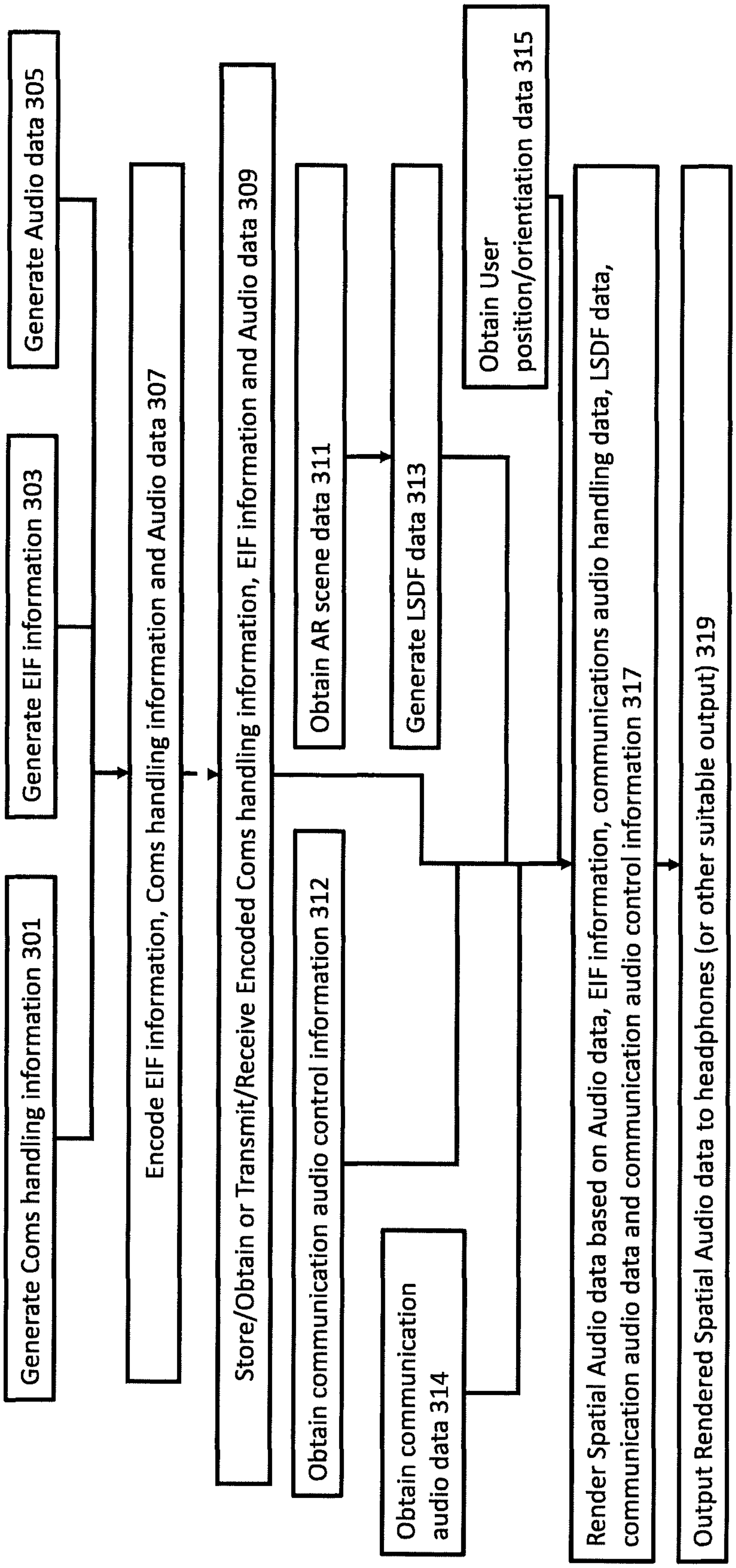
FIG. 3 shows a flow diagram of the operation of the system of apparatus as shown in FIG. 2 according to some embodiments.

With respect to FIG. 3 is shown an example operation of the system shown in FIG. 2.

The communications audio handling data is obtained (or generated) as shown in FIG. 3 by step 301.

The method may comprise generating or otherwise obtaining the EIF information as shown in FIG. 3 by step 303.

The audio data is furthermore obtained (or generated) as shown in FIG. 3 by step 305.

The EIF information, communications audio handling data and audio data is then encoded as shown in FIG. 3 by step 307.

The encoded data is then store/obtained or transmitted/received as shown in FIG. 3 by step 309.

Additionally the AR scene data is obtained as shown in FIG. 3 by step 311.

From the sensed AR scene data a listening space description (file) information is generated as shown in FIG. 3 by step 313.

The communication audio control information can furthermore be obtained as shown in FIG. 3 by step 312.

The communication audio data is also obtained as shown in FIG. 3 by step 314.

Furthermore the listener/user position and/or orientation data can be obtained as shown in FIG. 3 by step 315.

Then spatial audio signals can be rendered based on the audio data, the communication audio control information, the communication audio, the EIF information, LSDF data and the position and/or orientation data. Specifically the rendering comprises a combination of the audio signals as shown in FIG. 3 by step 317.

Having rendered spatial audio signals these can be output to a suitable output device, such as headphones as shown in FIG. 3 by step 319.

Figure 4:
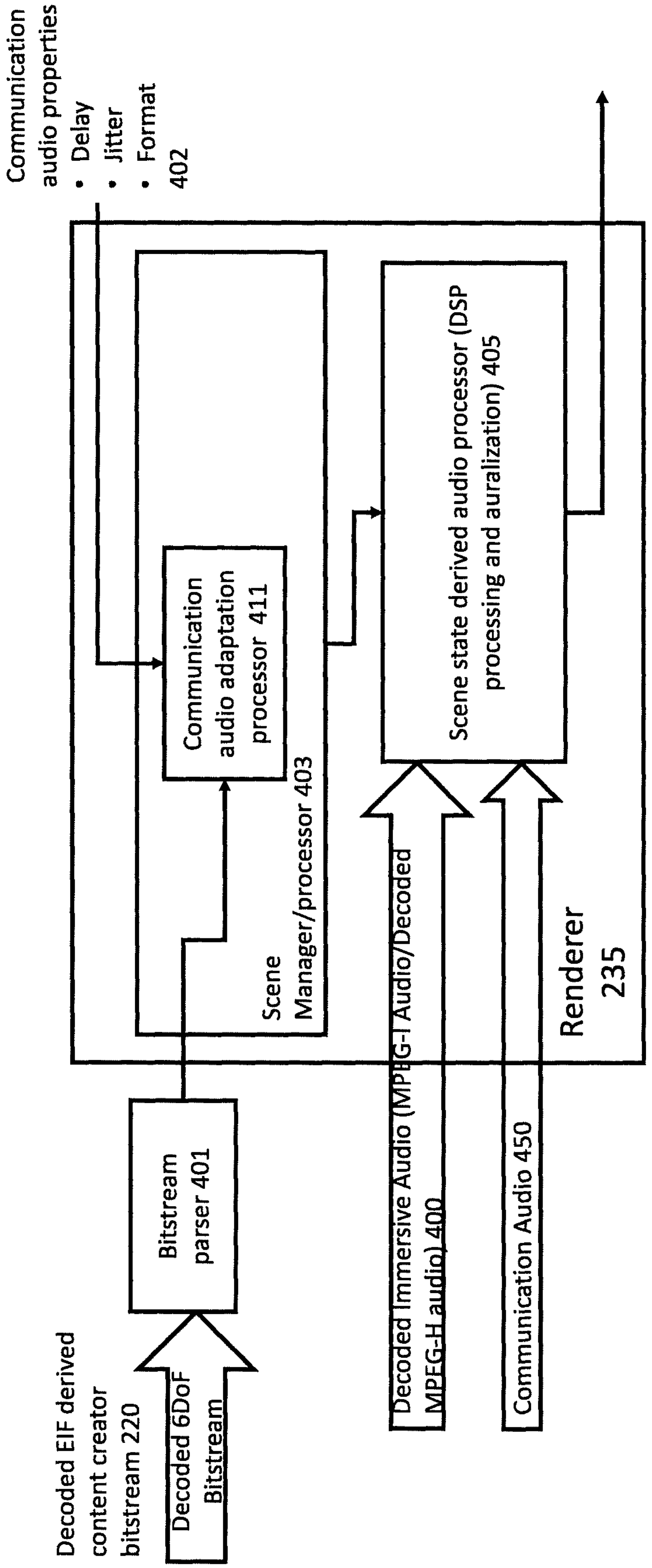
FIG. 4 shows schematically an example renderer as shown in FIG. 2 according to some embodiments.

FIG. 4 shows an example renderer 235 suitable for implementing some embodiments and can be configured to enable fused audio signals.

FIG. 4 shows, for example, that before the renderer 235 a bitstream parser 401 configured to receive the decoded 6DoF bitstream. The parsed EIF data can then be passed to a scene manager/processor 403.

The renderer 235 in some embodiments comprises a scene manager/processor 403. The scene manager/processor 403 is configured to receive the parsed EIF from the bitstream parser 401, The communications control information, for example parameters defining the delay, jitter and the format of the communications audio data 402.

The scene manager/processor 403 in some embodiments comprises a communications audio adaption processor 411 which is configured to control the auralization pipeline (or DSP processing for rendering) according to the information such as the content creator preference (obtained from the bitstream) regarding the communication audio handling, communication audio allowed budget for delays.

The scene management information can then be passed to the scene state derived audio processor 405.

The scene manager/processor 403 furthermore may be configured to obtain the decoded 6DoF audio signals, the processed scene information and the listeners position and/or orientation and from these generate the spatial audio signal output. As indicated above the effect of the scene manager/processor 403 is such that any known or suitable spatial audio processing implementation can be employed (the auralisation pipeline being agnostic to the earlier scene processing).

The renderer 235 in some embodiments comprises a scene state derived audio processor (DSP processing and auralization) 405. The scene state derived audio processor (DSP processing and auralization) 405 is configured to receive the configuration information from the scene manager/processor 403, the decoded Immersive Audio (MPEG-I Audio/Decoded MPEG-H audio) 400 and the decoded communications audio signals 450 and generate the spatial audio signals.

Figure 5:
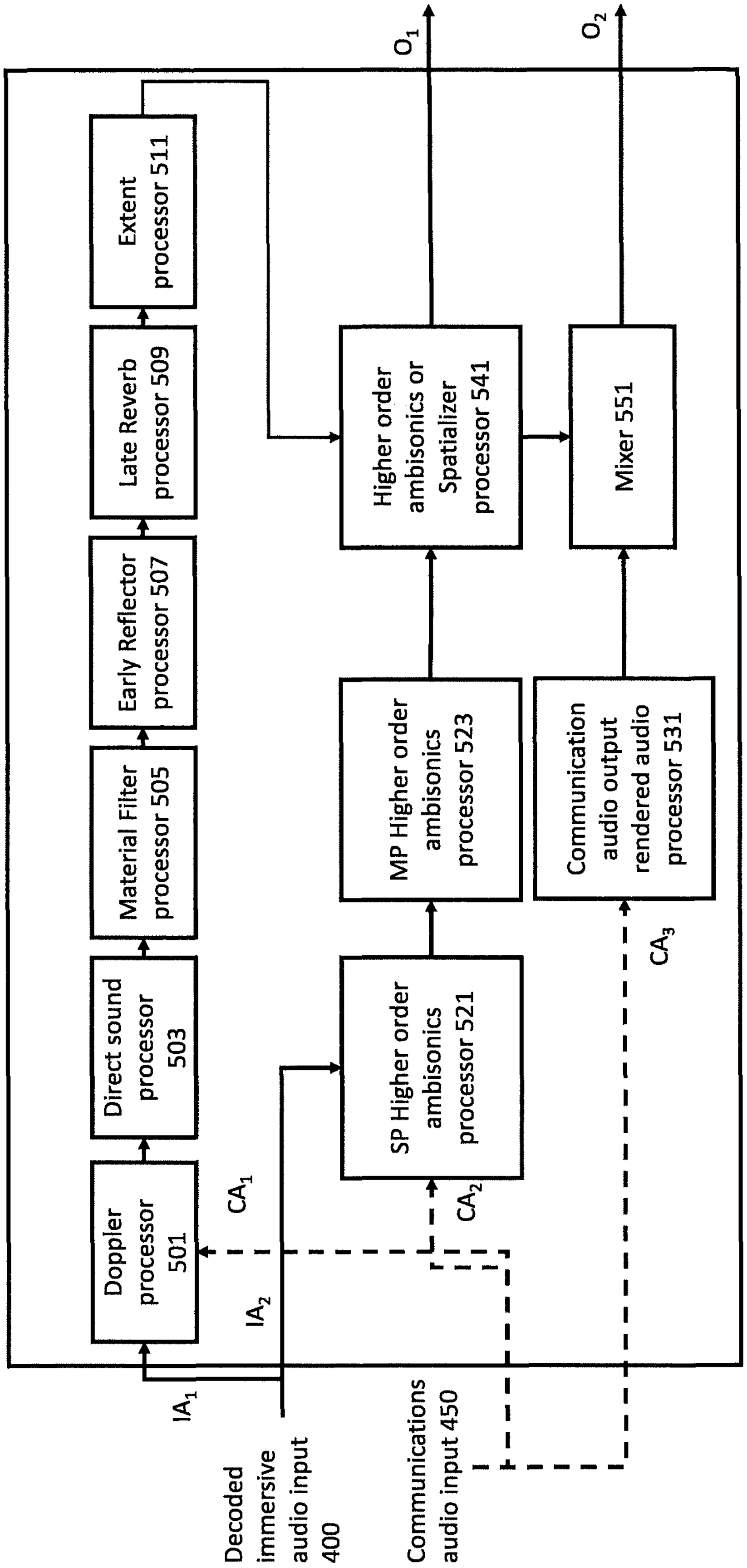
FIG. 5 shows schematically an example scene state derived audio processor as shown in FIG. 4 according to some embodiments.

With respect to FIG. 5 is shown an example scene state derived audio processor (DSP processing and auralization) 405. scene state derived audio processor is configured to obtain the decoded immersive audio (IA) and communication audio (CA) flow via the different rendering modules in the auralization pipeline. In some embodiments the processor 405 is configured to employ multiple processing paths depending on the IA format type ($IA_1$ and $IA_2$). Similarly, the communication audio (CA) may have multiple paths (in this example there are three candidate paths depending on the CA format—$CA_1$, $CA_2$ and $CA_3$). The different rendering modules are annotated with index numbers which indicate possible insertion points for the IA or CA. Additionally the example processor 405 shown herein has two output options. A first option with a mixer ($O_2$) and the other without a mixer ($O_1$).

A first pathway $IA_1$-$CA_1$ is configured where the following processing operations may be applied to the audio signals and an audio object modelling processing applied.

In some embodiments the scene state derived audio processor (DSP processing and auralization) 405 comprises a doppler processor 501 which is configured to control doppler processing of the immersive audio (IA) and communications audio (CA) based on the control information from the configuration information from the scene manager/processor 403.

In some embodiments the scene state derived audio processor (DSP processing and auralization) 405 comprises a direct sound processor 503 which is configured to control direct sound processing of the immersive audio (IA) and communications audio (CA) based on the control information from the configuration information from the scene manager/processor 403.

In some embodiments the scene state derived audio processor (DSP processing and auralization) 405 comprises a material filter processor 505 which is configured to control material filter processing of the immersive audio (IA) and communications audio (CA) based on the control information from the configuration information from the scene manager/processor 403.

In some embodiments the scene state derived audio processor (DSP processing and auralization) 405 comprises an early reflector processor 507 which is configured to control the early reflector sound processing of the immersive audio (IA) and communications audio (CA) based on the control information from the configuration information from the scene manager/processor 403.

In some embodiments the scene state derived audio processor (DSP processing and auralization) 405 comprises a late reverberation processor 509 which is configured to control late reverberation processing of the immersive audio (IA) and communications audio (CA) based on the control information from the configuration information from the scene manager/processor 403.

In some embodiments the scene state derived audio processor (DSP processing and auralization) 405 comprises an extent processor 511 which is configured to control extent sound processing of the immersive audio (IA) and communications audio (CA) based on the control information from the configuration information from the scene manager/processor 403.

It would be understood that the ordering of the processes above can be any suitable ordering. The output of the object processing processors can be passed to a higher order ambisonics or spatializer processor 541.

A second pathway $IA_2$-$CA_2$ may be one in which the following processing operations may be applied to the audio signals and a higher order ambisoncs processing applied.

In some embodiments the scene state derived audio processor (DSP processing and auralization) 405 comprises a SP higher order ambisonics processor 521 which is configured to control a SP higher order ambisonics processing of the of the immersive audio (IA) and communications audio (CA) based on the control information from the configuration information from the scene manager/processor 403.

In some embodiments the scene state derived audio processor (DSP processing and auralization) 405 comprises a MP higher order ambisonics processor 523 which is configured to control a MP higher order ambisonics processing of the of the immersive audio (IA) and communications audio (CA) based on the control information from the configuration information from the scene manager/processor 403.

The output of the higher order ambisonics processing can in some embodiments be passed to the higher order ambisonics fo spatializer processor 541.

The first and second pathways go to the higher order ambisonics fo spatializer processor 541 which is configured to select one of the two pathways to output, either as an output $O_1$ or to the mixer 551 based on the audio format such as from the control information from the configuration information from the scene manager/processor 403.

A third pathway $CA_3$ may be one in which the following processing operations may be applied to the audio signals and a rendering processing applied.

In some embodiments the scene state derived audio processor (DSP processing and auralization) 405 comprises a communications audio output rendered audio processor 531 which is configured to control a processing of the communications audio (CA) based on the control information from the configuration information from the scene manager/processor 403.

The output of the communications audio output rendered audio processor 531 can in some embodiments be passed to the mixer 551.

In some embodiments the scene state derived audio processor (DSP processing and auralization) 405 comprises a mixer configured to receive the outputs of the communications audio output rendered audio processor 531 and the higher order ambisonics or spatializer processor 541 and mix these based on the control information from the configuration information from the scene manager/processor 403 to generate the mixed output $O_2$.

Figure 6:
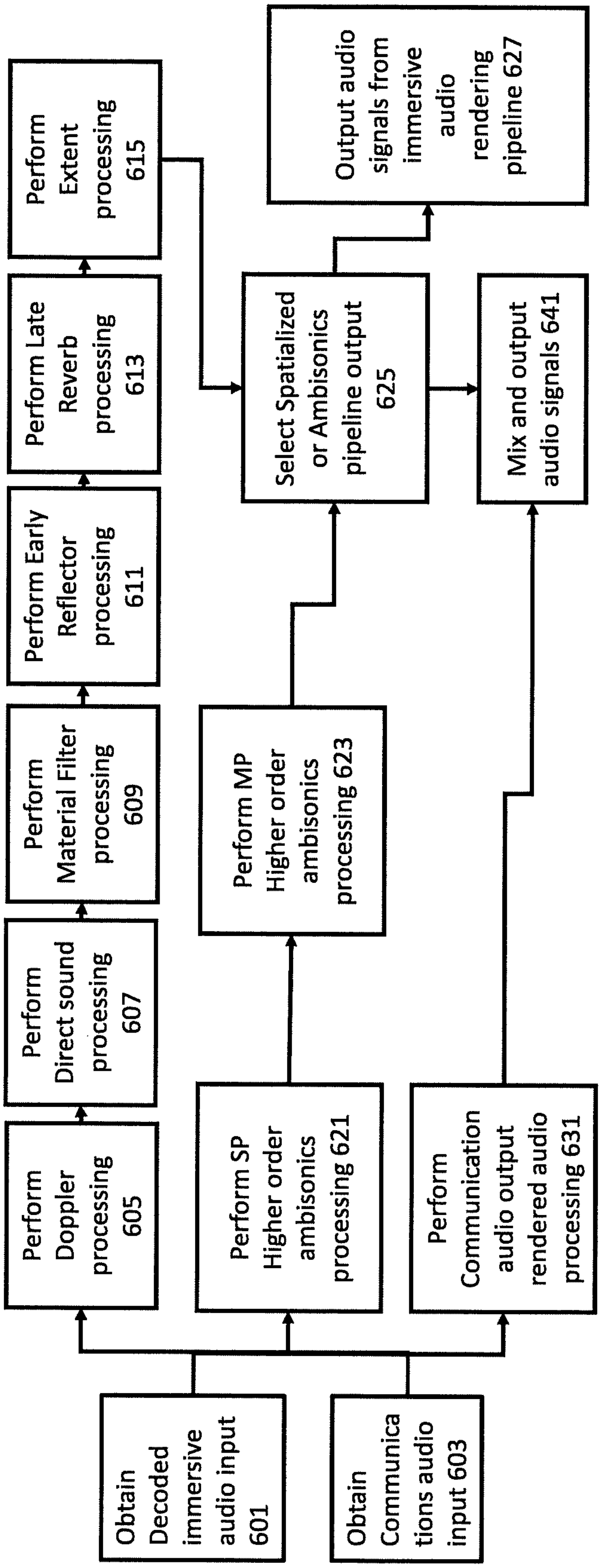
FIG. 6 shows a flow diagram of the operations within the example scene state derived audio processor as shown in FIG. 5 according to some embodiments.

With respect to FIG. 6 is shown an example flow diagram showing the operation of the scene state derived audio processor (DSP processing and auralization) 405 as shown in some embodiments.

The decoded immersive audio input is received or obtained from listening space description as shown in FIG. 6 by step 601.

Additionally the communications audio input is received or obtained as shown in FIG. 6 by step 603.

There are further shown the processing pipelines.

The spatialization processing pipeline is shown by steps 605 to 615. These are doppler processing shown in FIG. 6 by step 605, direct sound processing shown in FIG. 6 by step 607, material Filter processing shown in FIG. 6 by step 609, early reflector processing shown in FIG. 6 by step 611, late reverberation processing shown in FIG. 6 by step 613 and extent processing shown in FIG. 6 by step 615.

The ambisonics processing pipeline is shown by steps 621 and 623. These are SP Higher order ambisonics processing as shown in FIG. 6 by step 621 and MP Higher order ambisonics processing as shown in FIG. 6 by step 623.

The pre-rendered communications audio output pipeline is shown by communication audio output rendered audio processing as shown in FIG. 6 by step 631.

Additionally is shown a select spatialized or ambisonics pipeline output as shown in FIG. 6 by step 625.

In some embodiments the selected spatialized or ambisonics processing pipeline output or in other words the output of the immersive audio rendering pipeline is then output as an unmixed audio signals as shown in FIG. 6 by step 627.

In some embodiments the selected spatialized or ambisonics processing pipeline output and the pre-rendered communications audio output pipeline are mixed and output as shown in FIG. 6 by step 641.

Figure 7:
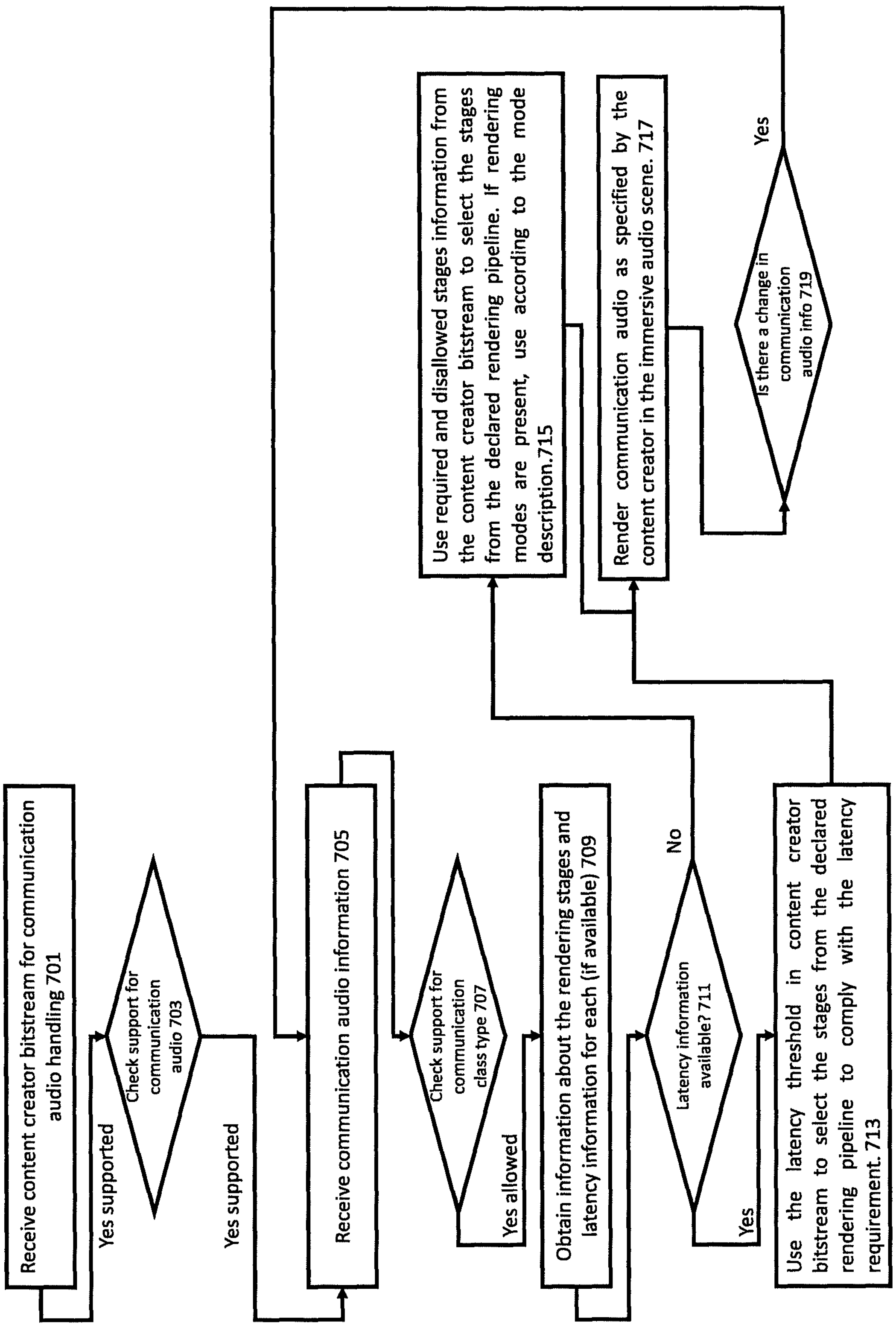
FIG. 7 shows a flow diagram of the operations of implementing communications audio within the system according to some embodiments.

FIG. 7 shows a flow diagram which describes the steps for determining the appropriate audio insertion point and selection of processing steps for communication audio rendering.

The method is configured to receive content creator bitstream for communication audio handling as shown in FIG. 7 by step 701. This can be obtained as part of the MPEG-I 6DoF content.

Then a check is performed to determine whether if communication audio consumption is permitted in the currently consumed immersive audio scene. This check is shown in FIG. 7 by step 703.

If the consumption is permitted and supported then the following operation is configured to retrieve communication audio information as shown in FIG. 7 by step 705.

A further check can then be performed to determine if the permitted communication audio type (e.g., commentary, bidirectional, etc.) is supported as shown in FIG. 7 by step 707. In some embodiments (not shown) where the check determines that the audio type is not permitted, the method should pause the immersive audio scene and continue or switch to the communications audio.

Where the type is supported then the rendering stages declaration and the associated latency information is then received or otherwise obtained as shown in FIG. 7 by step 709. This will provide information about the available rendering stages and potential insertion points for the communication audio.

In some embodiments there can follow a further check operation to determine if latency threshold information is present as shown in FIG. 7 by step 711.

Where the latency threshold information is present then the method can be configured to utilize the rendering stages latency to select the stages from the declared rendering pipeline as shown in FIG. 7 by step 713.

In some embodiments this can be implemented by:

Subtracting the communication audio latency (ca_delivery_latency) from the latency threshold to obtain the latest latency requirement;

Determining, using the communication audio format type, the candidate rendering stages applicable for the format type (ca_format_type).

If the DisallowedRenderingStagesStruct( ) is present, the information can be used it is used to discard the stages from the relevant declared rendering pipeline;

Prioritize the inclusion of rendering stages indicated in the RequiredRenderingStagesStruct( ) while complying with the latest latency requirement; and Controlling the insertion or input of the communication audio in the first rendering stage obtained from the above operation.

Where the latency threshold information is not present then the method can be configured to use required and disallowed stages information from the content creator bitstream to select the stages from the declared rendering pipeline. Furthermore, if rendering modes are present then the rendering is then set to be implemented based on the rendering mode. The selection of the stages and if present the setting of the rendering based on the rendering mode is shown in FIG. 7 by step 715. This can for example use the following operations:

Obtaining the latest latency requirement based on the requirements derived by obtaining the difference between the ca_delivery_latency and ca_class_type;

Determining, based on the communication audio format type, the candidate rendering stages applicable for the ca_format_type;

If the DisallowedRenderingStagesStruct( ) is present, it is used to discard the stages from the relevant declared rendering pipeline;

Prioritize the inclusion of rendering stages indicated in the RequiredRenderingStagesStruct( ) while complying with the latest latency requirement; and Inserting the communication audio in the first rendering stage obtained from the above operation.

The communication audio is then rendered as shown in FIG. 7 by step 717.

In some embodiments there is then obtained a new communication audio latency. If the difference from the currently estimated latency requirements changes more than a predefined threshold, the audio rendering pipeline is modified. This is shown in FIG. 7 by step 719 where a check step is performed determining if there is a change in communications audio info and where the response is yes then the operation passes back to step 705.

An example audio object format communication audio scenario is one where the communications audio signal with format type mono is treated as audio object if the content creator bitstream specifies acoustic modelling similar to an audio object. The audio object is rendered with acoustic processing steps specified in the rendering pipeline as long as the latency requirement can be satisfied. However, if in another instance it is observed that a particular render processing step (e.g., source extent or any such step which adds significant rendering latency), the particular rendering step is omitted, provided it is not part of the required stages metadata.

A further example is HOA format communication audio where the communication audio is delivered as a HOA source with content creator bitstream indicating HOA source with extent with translation support within the HOA source. It is observed based on the latency constraints that this processing can be accommodated where the rendering pipeline is selected to include single HOA source rendering. In another instance for the same scene it is observed that the communication audio latency is too high to allow single point HOA rendering with translation. Consequently, the HOA source communication audio is rendered without any translation processing but directly mixed with the immersive audio output at the mixer block.

Figure 8:
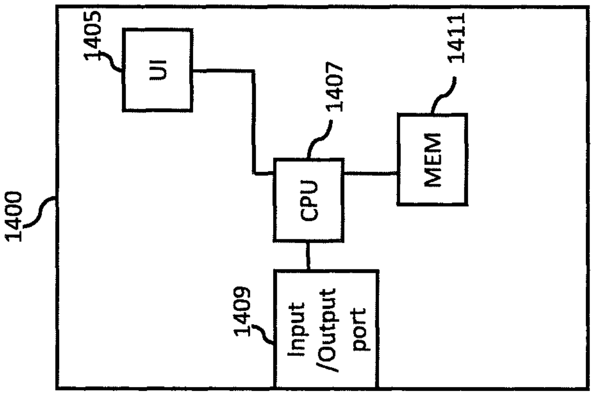
FIG. 8 shows schematically an example device suitable for implementing the apparatus shown.

With respect to FIG. 8 an example electronic device which may represent any of the apparatus shown above. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for rendering a communication audio signal within an immersive audio scene comprising:

at least one processor; and at least one memory storing instructions that, when executed with the at least one processor, cause the apparatus at least to:

obtain at least one spatial audio signal for rendering within the immersive audio scene;

obtain the communication audio signal and positional information associated with the communication audio signal;

obtain a rendering processing parameter associated with the communication audio signal and the positional information;

determine a rendering method based on the rendering processing parameter; and determine an insertion point of at least the communication audio signal in a rendering processing for the determined rendering method, and/or a selection of rendering elements for the determined rendering method, based on the rendering processing parameter.

2. The apparatus as claimed in claim 1, wherein the immersive audio scene comprises a six-degree-of-freedom immersive audio scene, wherein the at least one memory stores instructions that, when executed with the at least one processor, cause the apparatus to:

generate at least one output spatial audio signal for rendering the communication audio signal within the six-degree-of-freedom immersive audio scene according to at least one of a user position or a user orientation, wherein the at least one output spatial audio signal is generated based on the at least one spatial audio signal, the communication audio signal, the determined insertion point, and the at least one of the user position or the user orientation.

3. The apparatus as claimed in any of claim 1, wherein the at least one memory stores instructions that, when executed with the at least one processor, cause the apparatus to:

determine at least one of:

an audio format associated with the communication audio signal;

an allowed delay value; or a communication audio signal delay.

4. The apparatus as claimed in claim 3, wherein determining the insertion point of at least the communication audio signal in the rendering processing comprises the at least one memory stores instructions that, when executed with the at least one processor, cause the apparatus to at least one of:

determine the insertion point of at least the communication audio signal in the rendering processing further based on the determined at least one of: the audio format associated with the communication audio signal; the allowed delay value; or the communication audio signal delay; or determine the rendering method and/or the selection of the rendering elements for the determined rendering method based on the determined at least one of: the audio format associated with the communication audio signal; the allowed delay value; or the communication audio signal delay.

5. The apparatus as claimed in claim 4, wherein the allowed delay value comprises an amount of delay that is allowed for consuming the communication audio signal; and the communication audio signal delay comprises a determined delay value based on an end-to-end delivery latency and latency rendering the communication audio.

6. The apparatus as claimed in claim 2, wherein the generated at least one output spatial audio signal represents the communication audio signal as a higher order ambisonic audio signal.

7. The apparatus as claimed in claim 2, wherein the at least one memory stores instructions that, when executed with the at least one processor, cause the apparatus to:

obtain a user input, wherein the at least one output spatial audio signal is further generated based on the user input, wherein the user input is configured to define at least one of:

a permitted communications audio signal type;

a permitted audio format;

the allowed delay value; or at least one acoustic modelling preference parameter.

8. The apparatus as claimed in claim 2, wherein the at least one memory stores instructions that, when executed with the at least one processor, cause the apparatus to:

obtain a communication audio signal type associated with the communication audio signal, and generate the at least one output spatial audio signal further based on the at least one communications audio signal type associated with the communication audio signal.

9. The apparatus as claimed in claim 1, wherein the rendering elements comprise processors in an audio processing pipeline configured for performing the determined rendering method, wherein the rendering processing and/or the rendering elements comprise one or more of:

doppler processing;

direct sound processing;

material filter processing;

early reflection processing;

diffuse late reverberation processing;

source extent processing;

occlusion processing;

diffraction processing;

source translation processing;

externalized rendering; or in-head rendering.

10. The apparatus as claimed in claim 1, wherein the rendering processing parameter is configured to control integration of the communication audio signal with the at least one spatial audio signal, wherein determining the insertion point comprises the at least one memory stores instructions that, when executed with the at least one processor, cause the apparatus to:

determine a rendering mode, wherein the rendering mode comprises a value indicating the insertion point of at least the communication audio signal.

11. The apparatus as claimed in claim 10, wherein the value indicating the insertion point comprises one of:

a first mode value indicating the communication audio signal and the at least one spatial audio signal are inserted at the start of the rendering processing;

a second mode value indicating the communication audio signal bypasses the rendering processing and is mixed directly with an output of the rendering processing applied to the at least one spatial audio signal; or a third mode value indicating the communication audio signal is partially processed for rendering while the rendering processing is applied in full to the at least one spatial audio signal.

12. The apparatus as claimed in claim 11, wherein the third mode value indicating the communication audio signal is partially processed for rendering is a value indicating the communication signal is direct sound rendered for point sources and binaural rendered with respect to a user position.

13. The apparatus as claimed in claim 1, wherein the at least one memory stores instructions that, when executed with the at least one processor, cause the apparatus to:

determine at least one of:

an audio format type for the communication audio signal based on the rendering processing parameter; or the insertion point of at least the communication audio signal in the rendering processing for the communication audio signal within the determined rendering method based on the audio format type.

14. The apparatus as claimed in claim 12, wherein determining the insertion point of at least the communication audio signal in the rendering processing for the determined rendering method based on the audio format type comprises the at least one memory stores instructions that, when executed with the at least one processor, cause the apparatus to:

determine, when the audio format type for the communication audio signal comprises a pre-rendered spatial audio format, that the insertion point of at least the communication audio signal in the rendering processing comprises a direct mixing with an output of the rendering processing applied to the at least one spatial audio signal.

15. A method for an apparatus for rendering a communication audio signal within an immersive audio scene, the method comprising:

obtaining at least one spatial audio signal for rendering within the immersive audio scene;

obtaining the communication audio signal and positional information associated with the communication audio signal;

obtaining a rendering processing parameter associated with the communication audio signal and the positional information;

determining a rendering method based on the rendering processing parameter; and determining an insertion point of at least the communication audio signal in a rendering processing for the determined rendering method, and/or selecting rendering elements for the determined rendering method, based on the rendering processing parameter.

16. The method as claimed in claim 15, wherein the immersive audio scene comprises a six-degree-of-freedom immersive audio scene, the method further comprising:

generating at least one output spatial audio signal for rendering the communication audio signal within the six-degree-of-freedom immersive audio scene according to at least one of a user position or a user orientation, wherein the at least one output spatial audio signal is generated based on the at least one spatial audio signal, the communication audio signal, the determined insertion point, and the at least one of the user position or the user orientation.

17. The method as claimed in claim 15, further comprising:

determining at least one of:

an audio format associated with the communication audio signal;

an allowed delay value; or a communication audio signal delay.

18. The method as claimed in claim 17, wherein determining the insertion point of at least the communication audio signal in the rendering processing comprises at least one of:

determining the insertion point of at least the communication audio signal in the rendering processing further based on the determined at least one of: the audio format associated with the communication audio signal; the allowed delay value; or the communication audio signal delay; or determining the rendering method and/or the selection of the rendering elements for the determined rendering method based on the determined at least one of: the audio format associated with the communication audio signal; the allowed delay value; or the communication audio signal delay.

19. The method as claimed in claim 15, wherein determining the insertion point comprises:

determining a rendering mode, wherein the rendering mode comprises a value indicating the insertion point of at least the communication audio signal.

20. The method as claimed in claim 15, further comprising:

determining at least one of:

an audio format type for the communication audio signal based on the rendering processing parameter; or the insertion point of at least the communication audio signal in the rendering processing for the communication audio signal within the determined rendering method based on the audio format type.

* * * * *